Oct. 29, 1957        L. BIHALY        2,811,121
METHOD OF MAKING A MULTI-PLY ONE-PIECE COLLAR
Filed Feb. 23, 1954        2 Sheets-Sheet 1
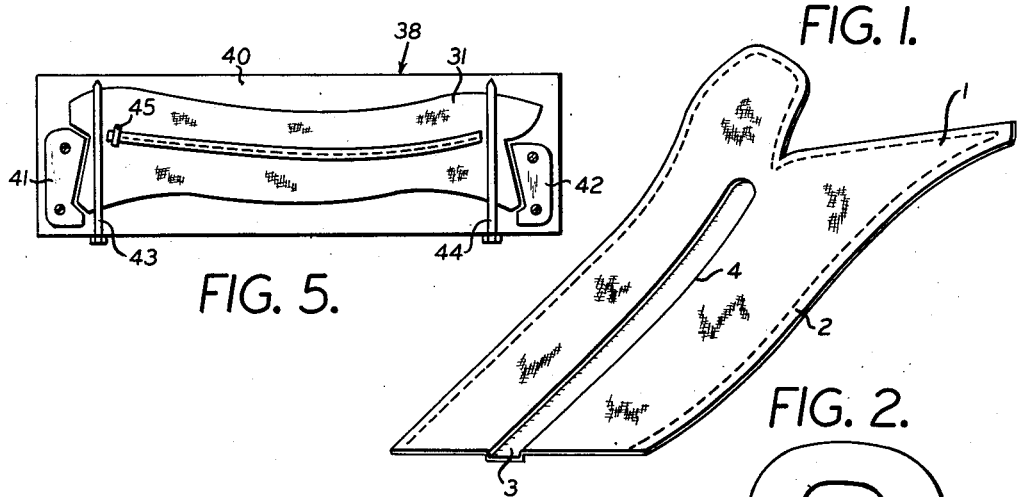
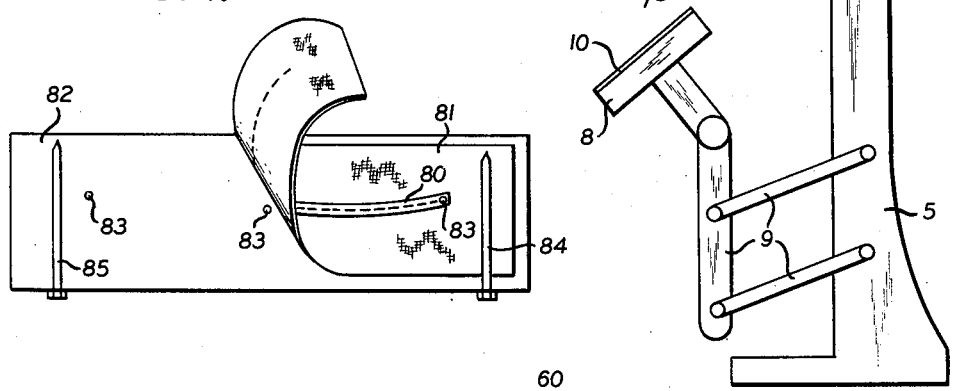
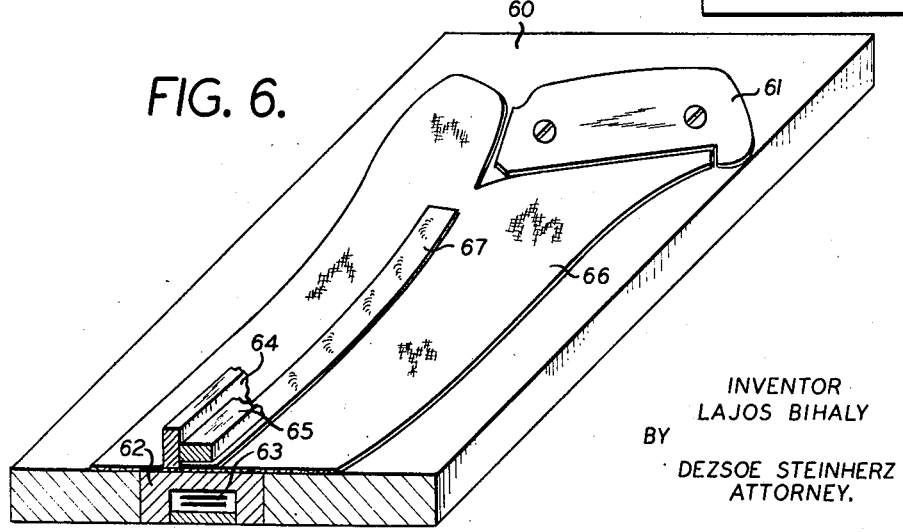
INVENTOR
LAJOS BIHALY
BY
DEZSOE STEINHERZ
ATTORNEY.

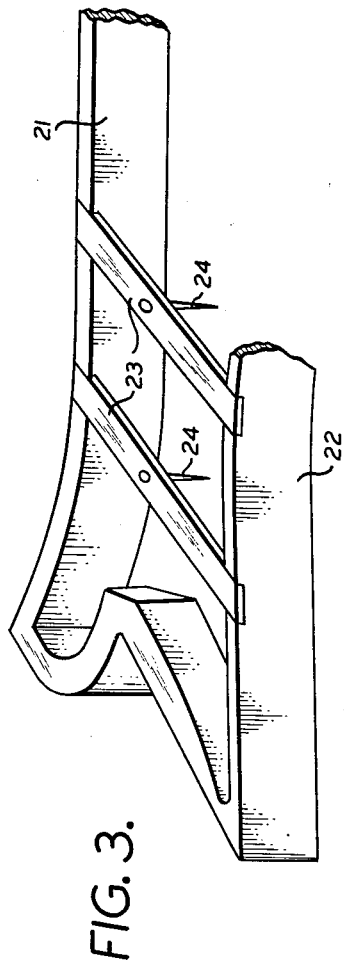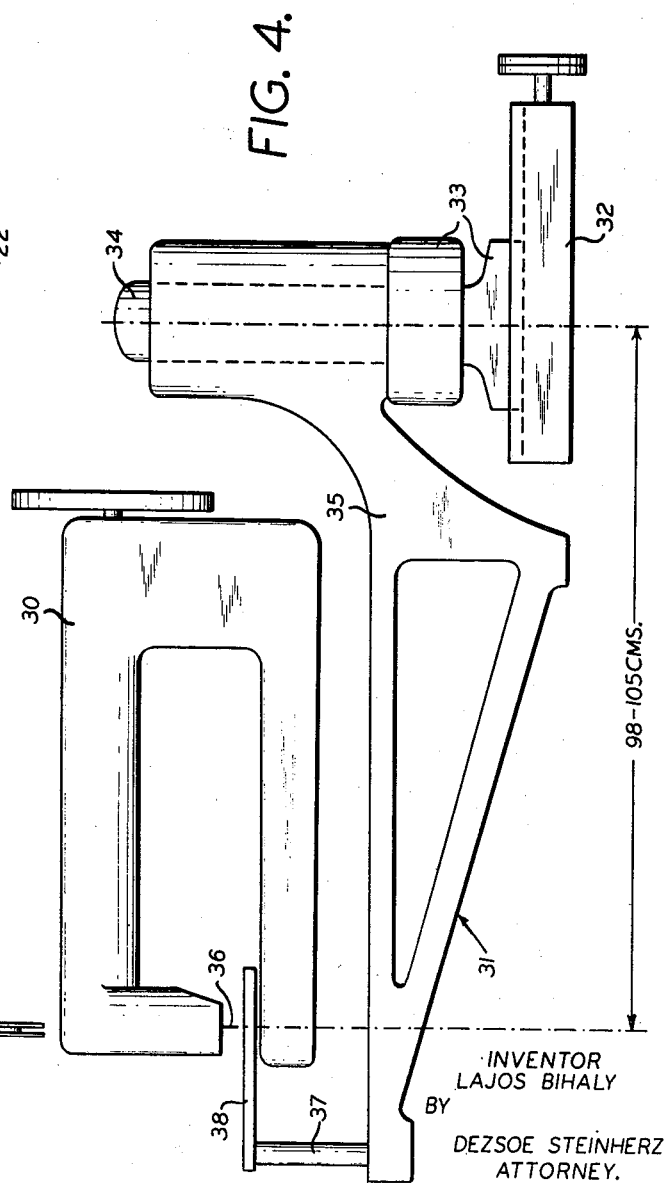

United States Patent Office 2,811,121
Patented Oct. 29, 1957

2,811,121

METHOD OF MAKING A MULTI-PLY ONE-PIECE COLLAR

Lajos Bihaly, London, England, assignor to Laminex Company, Vaduz, Liechtenstein Application February 23, 1954, Serial No. 412,029

8 Claims. (Cl. 112—2)

During recent years one-piece collars have attracted an increased interest among collar manufacturers. In a collar of this type each of the several, generally three, collar plies is cut in one piece comprising both the collar top and the collar band. In comparison with the conventional two-piece collar—in which in each ply the collar top and the collar band are cut out separately—the one-piece collar has obvious advantages such as greater ease of manufacture and improved wearing characteristics.

The greatest difficulty in the manufacture of a one-piece collar resides in the fact that the foldline is not automatically determined because the one-piece collar does not have a collar band seam which, in the two-piece collar, automatically establishes the location of the foldline. For this reason, additional means and steps are required for producing an effective foldline on the one-piece collar; however, the means and steps applied so far, did not encourage a more wide-spread manufacture of one-piece collars.

Considering the difficulties of the foldline problem it should be noted that the foldline must fulfill high requirements not only with respect to durability, i. e. resistance to premature wearing out and undiminished effectiveness after repeated laundering, but also with respect to its exact location in relation to the contour of the collar.

Many suggestions have been made for the solution of this problem. For one-piece collars of any type, i. e. soft collars, starched collars and chemically stiffened or fused collars, it has been suggested to incorporate an additional part in the collar, for producing a reinforcement of the collar along and preferably immediately below the foldline, thereby giving the collar the desired tendency to fold along the reinforced margin and thus on the foldline. An example of such a reinforcing insert is a narrow strip of textile material attached to one of the plies of the collar along the foldline zone (U. S. Patent No. 2,105,668, Swiss patent specification 143,365). In another known structure, one of the collar plies is made of two pieces, the collar thus receiving a foldline-determining collar band seam which establishes the foldline (British Patent Nos. 451,018 and 572,718). Another principle of determining the foldline consists in making the foldline zone weaker than the rest of the collar. In collars of any type this may be achieved for example by cutting the lining ply in two pieces which are inserted into the collar in such a way that on or along the foldline a narrow zone of the collar is free of the lining (British Patent No. 513,613). Furthermore, it is possible to mechanically reduce the thickness of a bulky lining material along the foldline (U. S. Patent No. 1,631,985). In chemically stiffened or fused collars the weakening of the foldline may be achieved by preventing fusion between at least two plies, for example by applying resist material along the foldline zone (U. S. Patent No. 2,471,203). Further similar suggestions imply the use of a lining carrying an adhesive but woven in such a way as to be free of adhesive material along the foldline zone (Swedish Patent No. 93,472).

All the above-mentioned suggestions substantially deal with the first part of the problem of foldline determination, i. e. to bestow on the collar a tendency to fold along a predetermined line. There are considerably fewer suggestions for solving the problem of exactly coordinating the location of the foldline with the final contour of the collar. In this connection it may be mentioned that a lining has been proposed (Swedish Patent No. 97,101) in which a non-adhesive foldline zone is originally woven with the required curvature, thus facilitating the cutting of the lining with exact location of the foldline relative to the contour. It has also been suggested to deform a piece of lining material provided with a rectilinear non-adhesive zone in accordance with the desired curvature of this zone in the finished collar and to cut the lining ply from the piece of lining material while thus deformed (Danish Patent No. 68,831).

For solving the problem of coordinating the location of the foldline with the collar contour a method has been suggested (Swiss Patent No. 277,272) in which the final contour of a one-piece collar is at least in part established on the superimposed collar plies and a foldline-determining element is attached to one of the plies in a location predetermined with respect to the contour. This method gives satisfactory results but is rather complicated and therefore not always economical in connection with the manufacture of collars of cheaper quality.

The determination of the contour of a one-piece collar is generally effected by either of two methods, each of which corresponds to one of the two main general methods of making one-piece collars. The first of these general manufacturing methods, known as "run-and-turn" method, consists in assembling the three plies of the collar with the lining ply uppermost, stitching the plies together along three sides, turning the structure about the seam and finishing the collar, for example by stitching along the fourth side. The second of these general manufacturing methods of making one-piece collars consists in superimposing the plies in their final order, i. e. with the lining ply between the outer plies, then mechanically folding in the edges along the contour—this step is called "patent-turning"—and finally stitching the plies together. In the first mentioned method the contour is determined by the stitching line about which the structure is turned, while in the latter method the contour is determined by the position of the marginal fold. In connection with both methods mechanical accessories have been developed (automatically guided contour sewing: German Patent No. 731,225 and British Patent No. 366,334; the well-known patent-turning equipment such as the Wallwin machine).

In connection with all the conventional methods for determining the location of the foldline in relation to the contour it has been customary to coordinate the final contour, as defined by the marginal stitching line or marginal fold, with the location of the foldline. Whenever the actual manufacturing method implies the application of foldline-determining means (strips, tapes or zones of resist) to the lining it has been customary to start from the previously determined final contour in locating said foldline-determining means on the lining. The inverse method of locating the contour by reference to the predetermined foldline has so far only been used in such cases in which the foldline has been inherently predetermined on the lining, for example by weaving.

The most recent development in the manufacture of one-piece collars show the desirability of eliminating all restrictions with regard to the sequence of contour and foldline determining working steps. This is particularly desirable with respect to the recently developed technique of automatically guided contour sewing in order to enable this new technique to be adapted in the most advantageous way in existing plants, without unnecessary interference with their current manufacturing practice. It will be appreciated that the automatically guided contour sewing may be combined with various methods of determining the foldline. For instance, one manufacturer may stitch a foldline-determining tape onto the lining, another manufacturer may prefer to adhesively attach such a tape in a heating press, while a third manufacturer may apply a resist on the foldline zone etc. In each of these further instances different combinations of manufacturing steps may be desirable.

Very recent investigations have shown that the manufacturing methods implying coordinated determination of the contour and the foldline may be simplified considerably by the intercalation of an intermediary step directed to the manufacture of an intermediate product for the collar. This intermediate product is a piece of lining fabric cut with the ordinary margin allowance for the hem on which an element determining the location of the foldline in the finished collar in attached or the location of such an element is marked. It will be understood that the intermediate product according to the invention is to be used only in collars in which the foldline is determined by additional means attached to the lining ply, particularly by means of a tape or a resist. The intermediate product of the invention is not useful in connection with collars in which the lining itself is adapted to establish the foldline, due to its wearing structure. The essential novel feature of the intermediate product of the invention resides in the fact that the location of the foldline is not determined with respect to the final contour of the collar but is coordinated with the trimming contour of the lining ply, i. e. the outer contour of the lining blank cut with a normal, uniform margin allowance for the hem, this trimming contour of the lining blank obviously also being that of the blanks adapted to constitute the outer and inner plies of the collar. In one-piece collars of the type to which the present invention is applicable, i. e. collars in which the foldline is determined by additional means attached to the lining, the new intermediate product enables a collar to be manufactured with the foldline exactly located in relation to the final contour, this desirable result being attained by uniting the intermediate product, provided with the foldline-determining means, as the lining ply with the identically cut outer plies of the collar, the only, self-evident, requirement being that the plies are assembled with such precision as is normally required in any collar making method. It will also be appreciated that the intermediate product according to the invention may be used in connection with both the "run-and-turn" method and the collar making method based on "patent-turning."

The manufacture of the intermediate product requires steps for coordinating the trimming contour of the lining ply with the location of the foldline-determining means. In order to bring about this coordination, according to the invention on a piece of lining fabric the trimming contour corresponding to the final contour of the collar with the addition of a normal, uniform margin allowance for the hem, is stamped out, cut, creased or otherwise marked, or established in some other manner, and foldline determining-means are attached to said piece of lining fabric or the location of such means is marked on said piece of lining fabric, said piece of lining fabric being held or fittingly accommodated during this treatment or during each treatment step in at least two places exactly defining its location.

In the enclosed drawings the method of making the intermediate product according to the invention is illustrated by reference to some embodiments of suitable apparatus.

Fig. 1 is a perspective view of an embodiment of the intermediate product according to the invention;

Fig. 2 is a diagrammatic side elevation of a machine for making the intermediate product according to Fig. 1;

Fig. 3 is a perspective view of a portion of an appliance for making another embodiment of the intermediate product according to the invention;

Fig. 4 is a diagrammatic side elevation of a machine for applying a foldline-determining tape to an intermediate product according to the invention;

Fig. 5 is a diagrammatic plan view of a holder to be used in the machine according to Fig. 4, with an intermediate product according to the invention inserted in the holder;

Fig. 6 is a perspective view, partly in section, of certain parts of another device for applying a foldline-determining tape to an intermediate product according to the invention, and Fig. 7 is a holder for holding a piece of lining fabric provided with a foldline-determining tape in a device for stamping out or otherwise establishing or marking the trimming contour of an intermediate product according to the invention.

The intermediate product according to Fig. 1 is a cut piece 1 of lining fabric the contour of which corresponds to the desired collar contour with the addition of a normal, uniform margin allowance for the hem. The final collar contour is indicated by dash line 2. By means of a creasing die a shallow groove 3 is pressed into the piece of fabric 1 in a location in which in a subsequent working step a foldline-determining tape is to be applied, edge 4 of the groove being turned towards the collar top and extending exactly along the intended location of the foldline in the finished collar. Groove 3 enables the foldline-determining tape to be accurately located in a subsequent working step. If a tape of the improved type is used having two structurally and functionally different longitudinal zones, the broader zone being disposed in the collar band and adapted to increase the stiffness of the collar and the narrower zone extending on the foldline and diminishing the stiffness of the collar in the foldline zone itself, then groove 3 obviously must be located in such a way that the foldline zone falls within the groove and inwardly abuts on edge 4.

It will be obvious that the intermediate product according to Fig. 1 provided with groove 3 is adapted to bring about an exact coordination between the location of the foldline and the contour; if a foldline-determining tape is attached, for example stitched, to fabric 1 exactly on groove 3 and fabric piece 1 is exactly assembled with outer plies of a correspondingly cut shape, then a collar structure is obtained in which, starting from the intermediate product according to the invention, the contour and foldline are located in exact coordination.

Figure 2 shows a machine for pressing in the groove 3 of the intermediate product according to Figure 1. This machine essentially consists of a support 5 carrying at its upper end a stationary press element 6 the downwardly directed smooth face of which carries a ridge 7 of about ½ millimeter height and of a shape corresponding to groove 3. Below the stationary press element 6 a press table 8 is swingably mounted on swinging arms 9 journalled in the support 5. The swinging arms 9 are connected in any suitable way with a mechanism (not shown) for urging press table 8 against the lower face of press element 6. The upper surface of press table 8 carries a resilient padding 10 and is further provided with locating elements (not shown), for example elements as described below in connection with Figs. 5 and 6, enabling a cut piece of lining fabric to be placed on table 8 in predetermined spatial relation of its foldline to ridge 7 on press element 6. Thus, by pressing a cut piece of lining fabric, fittingly accommodated between the locating elements on press table 8, against press element 6, groove 3 is pressed into the piece of fabric in correct location relatively the trimming contour of the lining ply.

With the aid of the appliance shown in Fig. 3 a further embodiment of the intermediate product according to the invention may be manufactured. This appliance consists of a metal frame 21 the lower edge of which is shaped as a cutting or creasing edge. The cutting or creasing edge 22 represents exactly the trimming contour of a collar ply. By pressing frame 21 against a piece of lining fabric or against a plurality of superimposed pieces placed on a suitable backing the lining plies may be stamped out with the correct trimming contour or the ply or plies may be provided with a crease indicating the correct location of the trimming contour. Between opposite longitudinal sides of the metal frame 21 there are provided connecting plates 23 carrying needles 24 the points of which are in the same plane as the cutting or creasing edge 22. The needles 24 of which there are about 6 to 8 distributed over the whole length of the frame have their points on a line corresponding to the location of the foldline of the collar to be manufactured. When the pieces of lining fabric are stamped out or creased with the aid of the cutting or creasing edge 22 the needles 24 simultaneously form small holes in the fabric; in a subsequent working step these holes enable a foldline-determining tape to be applied in correct relation to the stamped-out or creased and then cut trimming contour of the lining ply.

Figures 4 and 5 show an arrangement for automatically guided stitching of a foldline-determining tape to a piece of lining fabric cut along the trimming contour. In Fig. 4, an ordinary sewing machine 30 is combined with a device 31 for automatic guiding of a work piece. Device 31 comprises a support 32 provided behind the driving side of the sewing machine, a slide 33 being adjustable on the support 32 in the direction of the sewing machine axis. Slide 33 carries a pivot 34 for a swinging arm 35. This arm 35 extends below the sewing machine substantially in the direction of the sewing machine axis to a point in front of needle 36. The free end of swinging arm 35 carries a vertical member 37 on which the work piece holder 38 is mounted in such a way that the work piece is carried past needle 36 along a curved path when the swinging arm 35 is turned about pivot 34. By suitable choice of the distance between needle 36 and the axis of pivot 34 the work piece is guided along an arc corresponding to the correct curvature of a collar foldline. In ordinary collars the radius of the circle arc yielding a correct foldline is between 98 and 105 centimeters, and consequently slide 33 will be adjustable on support 32 within these limits. The arrangement further comprises a supply reel 39 for continuously feeding in tape material. For the sake of simplicity the drawing only comprises such details as are indispensable for the understanding of this embodiment.

Fig. 5 is a plan view of work piece holder 38. Here, too, inessential details are not shown, for example the means for mounting the holder onto the vertical member 37. The essential parts of the holder are a base plate 40 and locating elements 41 and 42 enabling a lining ply cut along the trimming contour to be accurately located on the holder. The lining ply thus located is held in position by clamps 43 and 44. Part 45 shown in Fig. 5 is not a part of the work piece holder 38 but is a guide loop forming a part of the presser foot of the sewing machine and adapted to guide the tape coming from supply reel 39 towards the work piece adjacent the needle 36.

The way in which the arrangement according to Figs. 4 and 5 is operated will be obvious. When a piece of tape is to be stitched to a cut lining ply inserted in holder 38 the swinging arm 35 is swung into a position in which the needle 36 is positioned over the work piece inwardly of clamp 44. The free end of the tape is pulled through guide loop 45 and placed below the needle, the presser foot of the sewing machine is lowered, and then the sewing machine is started, the tape thus being stitched to the lining ply while the swinging arm 35 rotates as the stitching progresses towards clamp 43. When the stitching line is completed slightly short of clamp 43 the sewing machine is stopped, the presser foot is lifted and the tape is cut off from the supply at guide loop 45. The cut lining piece treated in this way is another embodiment of the intermediate product according to the invention.

Fig. 6 illustrates diagrammatically an embodiment of a device for adhesively attaching a fold-line-determining tape to a piece of lining fabric cut along the trimming contour. Here, too, only such parts are shown as are essential for performing the necessary working steps. On a base plate 60, locating elements 61 are adapted to allow accurate location of the ends of a piece 66 of lining fabric cut along the trimming contour. The provision of holding clamps is not imperative in this case but obviously such clamps may be arranged in some suitable manner. In a zone extending in accordance with the foldline of the collar to be manufactured the base plate 60 consists of metal in the form of an elongated bar 62 internally provided with an electric heating element 63. The base plate forms part of an apparatus which in addition comprises independently movable bars 64 and 65 having rectangular section. These bars extend in a curvature corresponding to the curvature of the foldline, bar 64 having its longer cross-sectional axis disposed vertically and bar 65 having its longer cross-sectional axis disposed horizontally and abutting with a minor side face against the convex larger side face of bar 64. The convex lower longitudinal edge of bar 64 extends in such a way in relation to a lining ply 66 correctly fitted between locating elements 61 that a foldline-determining tape 67 is correctly located when its collar band edge comes to lie exactly along said lower longitudinal edge of bar 64. Bar 65 is then positioned exactly above tape 67. By means of a suitable mechanism (not shown) bars 64 and 65 may be lifted from the base plate 60 and lowered upon the same independently of each other, bar 65 being capable of exerting the desired pressure.

With the aid of the device according to Fig. 6 a foldline-determining tape is attached to a piece of lining fabric 66 cut along the trimming contour and fitted between the locating elements 61 in the following way: When the lining ply 66 is placed on the base plate 60 both bars 64 and 65 are lifted. As soon as the lining ply is correctly located, bar 64 is lowered so as to rest upon lining ply 66, whereas bar 65 is held 1 to 2 millimeters above the lining ply. Now a tape 67 containing thermoplastic material and, if necessary, soaked with a suitable solvent for the thermoplastic material is placed on the lining ply in such a way that the entire length of its collar band edge is in contact with bar 64. Bar 65 prevents tape 67 from being turned up. Then bar 65 is lowered upon tape 67 under comparatively heavy pressure, the tape being adhesively attached to lining ply 66 by the combined action of the pressure from bar 65 and the heat radiated from bar 62. The lining ply 66 provided with attached tape 67 is another embodiment of the intermediate product according to the present invention.

Fig. 7 illustrates a method in which the sequence of the steps for determining the contour and applying the foldline-determining element is reversed in comparison with the embodiments described above. If for example a foldline-determining tape is stitched by means of an arrangement as shown in Figs. 4 and 5 to a square piece of lining fabric, it is possible to exactly locate the contour by reference to the predetermined foldline. For this purpose, as diagrammatically shown in Fig. 7, the piece of fabric 81 provided with the tape 80 is placed on a base plate 82. For locating purposes the base plate 82 is provided with at least two, preferably several, pins or needles 83 disposed on characteristic points, especially the ends, and preferably on intermediate points of a line corresponding to the foldline. In this case the piece of fabric must be placed onto base plate 82 in such a way that the pins or needles penetrate through tape 80 attached to fabric piece 81, preferably exactly on the center-line of the tape. If the piece of fabric 81 which by means of pins or needles 83 has now been located in a position predetermined by the foldline tape 80 is clamped to base plate 82 by means of clamps 84 and 85, then the base plate 82 may be located in an obvious way by means of fitting elements in relation to any suitable device for stamping out, cutting or marking the contour. In this manner there is obtained an embodiment of the intermediate product according to the invention similar to that shown in Fig. 5 but obtained by first applying the foldline-determining tape and determining the contour by reference and in exact spatial relation to the predetermined contour.

The above examples show that the basic method of manufacturing intermediate products according to the invention may be varied in many ways within the spirit and scope of the present invention.

What I claim is:

1. The method of making a multi-ply one-piece collar, characterized by cutting a piece of lining fabric along a trimming contour corresponding to the final contour of the collar with the addition of a normal margin allowance for the hem, placing said cut lining on a holder between locating elements conforming to at least part of said trimming contour, clamping said cut lining to the holder at at least two places outside the foldline zone, mounting the holder with the attached piece of fabric on a swinging arm co-operating with a sewing machine in such a way that when the arm is swung about its pivot the cut lining is moved past the needle of the sewing machine in an arcuate path conforming to the curvature of the foldline, stitching a foldline determining tape to said cut lining during the movement thereof past the needle of the sewing machine, and assembling said cut lining with correspondingly cut outer collar plies.

2. The method of making a multi-ply one-piece collar, said method comprising cutting a piece of lining fabric along a trimming contour corresponding to the final contour of the collar with the addition of a normal margin allowance for the hem, placing said cut lining on a support between locating elements conforming to at least part of the trimming contour and exactly locating said cut lining, placing a rod spatially coordinated with said locating elements and having the curvature of the desired foldline on said cut lining, placing a foldline determining tape on said cut lining with one edge in contact with one of the faces of said rod, attaching the tape to the fabric, and assembling said cut lining with correspondingly cut outer collar plies.

3. The method as claimed in claim 2 in which said tape is attached to said cut lining by heat and pressure acting on adhesive material contained in either of said tape and cut lining.

4. The method of making a multi-ply one-piece collar, said method comprising applying a foldline determining tape having the length and the curvature of the desired foldline of the collar to be made on a piece of lining fabric having greater dimensions than a trimming contour corresponding to the final contour of the collar with the addition of a normal margin allowance for the hem, placing said piece of fabric with attached tape in such a way on a support provided with needles along a line corresponding to the desired foldline that the needles penetrate the foldline determining tape at predetermined points, cutting the piece of lining along the trimming contour by means of an appliance spatially coordinated with said support, and assembling said cut lining with correspondingly cut outer collar plies.

5. The method of making a multi-ply one-piece collar, comprising cutting a piece of lining fabric to a trimming contour corresponding to the desired final contour of the collar with the addition of a margin allowance for the hem of predetermined uniform width, holding said cut lining in a position determined with respect to said trimming contour, attaching to said cut lining a length of tape with a foldline determining edge positioned in predetermined spatial relation to said trimming contour and thereby to the final contour of the collar as defined by the inner boundary of said margin allowance, assembling said cut lining with outer collar plies, and uniting said cut lining and outer collar plies along said final contour as defined on said cut lining by the inner boundary of said margin allowance.

6. The method of making a multi-ply one-piece collar, comprising attaching to a piece of lining fabric a length of tape with one edge shaped to determine the desired foldline of the collar, holding said piece of lining in a position determined with respect to said foldline determining edge of said tape, cutting said piece of lining to a trimming contour corresponding to the desired final contour of the collar with the addition of a margin allowance for the hem of predetermined uniform width, said cutting being carried out in proper spatial relation to said foldline determining edge of said tape, assembling said cut lining with outer collar plies, and uniting said cut lining and outer collar plies along said final contour as defined on said cut lining by the inner boundary of said margin allowance.

7. The method of making a multi-ply one-piece collar, comprising marking on a piece of lining fabric in proper mutual spatial relation, one the one hand, a trimming contour corresponding to the desired final contour of the collar with the addition of a margin allowance for the hem of predetermined uniform width and on the other hand the position of application of a length of tape with a foldline determining edge, cutting said piece of lining along the marked trimming contour, applying said tape in the marked position, assembling said cut lining with outer collar plies, and uniting said cut lining and outer collar plies along said final contour as defined on said cut lining by the inner boundary of said margin allowance.

8. The method of making a multi-ply one-piece collar, comprising cutting a piece of lining fabric to a trimming contour corresponding to the desired final contour of the collar with the addition of a margin allowance for the hem of predetermined uniform width, holding said cut lining in a position determined with respect to said trimming contour, marking on said cut lining the position of application of a length of tape in which a foldline determining edge on the tape is positioned in proper spatial relation to said trimming contour and thereby to the final contour of the collar as defined by the inner boundary of said margin allowance, applying said tape in the marked position, assembling said cut lining with outer collar plies, and uniting said cut lining and outer collar plies along said final contour as defined on said cut lining by the inner boundary of said margin allowance.

References Cited in the file of this patent

UNITED STATES PATENTS

| | | |
|---|---|---|
| 2,033,681 | Campbell | Mar. 10, 1936 |
| 2,066,294 | Liebowitz | Dec. 29, 1936 |
| 2,639,841 | Liebowitz | May 26, 1953 |
| 2,639,842 | Liebowitz | May 26, 1953 |
| 2,639,843 | Liebowitz | May 26, 1953 |
| 2,676,324 | Johnson | Apr. 27, 1954 |
| 2,705,582 | Liebowitz | Apr. 5, 1955 |

FOREIGN PATENTS

| | | |
|---|---|---|
| 725,608 | Great Britain | Mar. 9, 1955 |